No. 712,997. Patented Nov. 4, 1902.
D. DRUMMOND.
SPARK PREVENTER FOR LOCOMOTIVE OR OTHER ENGINES.
(Application filed May 26, 1902.)
(No Model.)
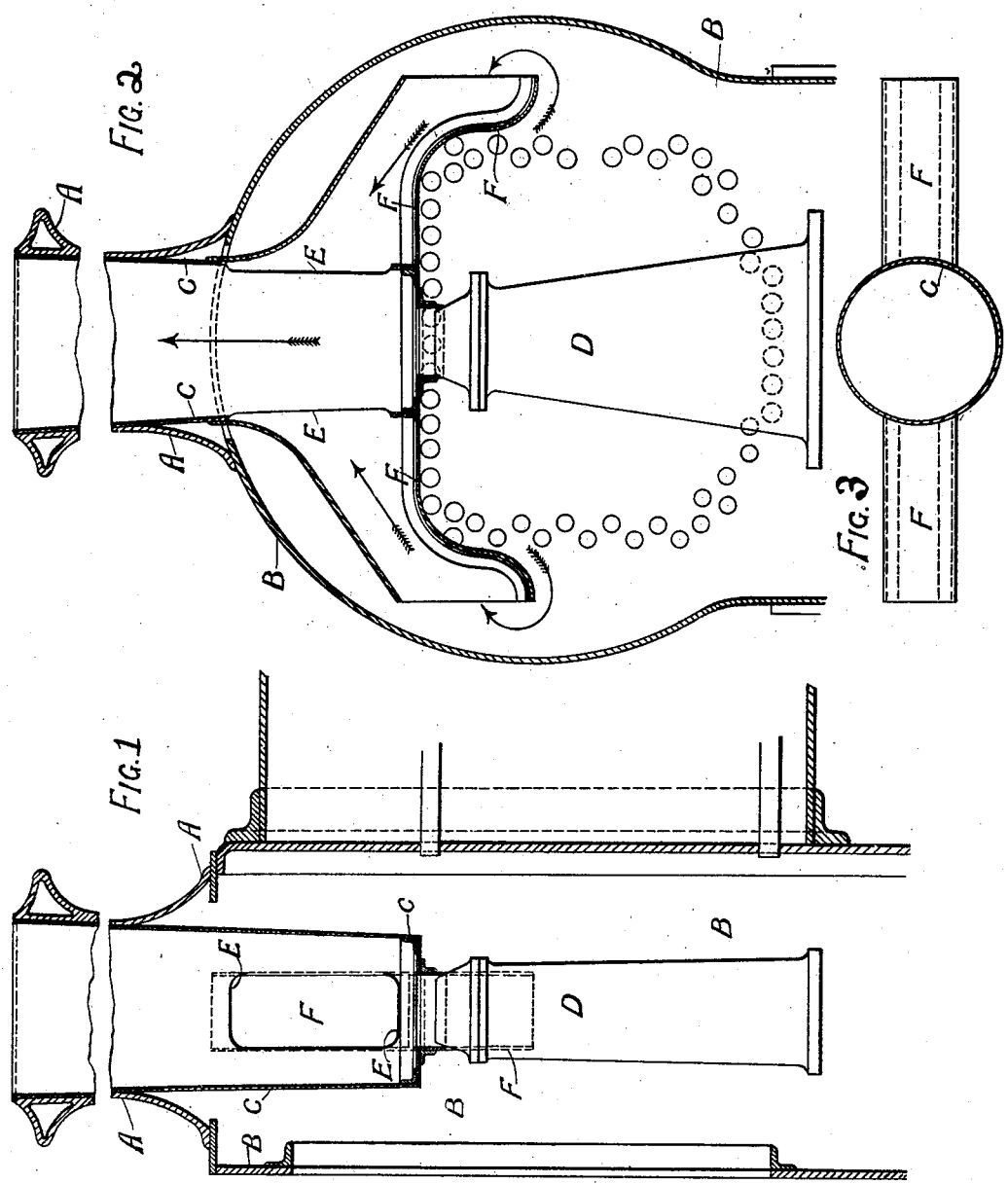

United States Patent Office.

DUGALD DRUMMOND, OF SURBITON, ENGLAND.

SPARK-PREVENTER FOR LOCOMOTIVE OR OTHER ENGINES.

SPECIFICATION forming part of Letters Patent No. 712,997, dated November 4, 1902.

Original application filed October 15, 1901, Serial No. 78,746. Divided and this application filed May 26, 1902. Serial No. 109,065. (No model.)

*To all whom it may concern:*

Be it known that I, DUGALD DRUMMOND, a subject of the King of the United Kingdom of Great Britain and Ireland, residing at South Bank Lodge, Surbiton, county of Surrey, England, have invented a certain new and useful Spark-Preventer for Locomotive or other Engines, (for which application for patent has been made in Great Britain, No. 13,769, dated July 6, 1901,) of which the following is a specification.

This invention, which is a division of my application, Serial No. 78,746, filed October 15, 1901, relates to devices for obviating the risk of damage to property by fire due to sparks carried by the blast or current of air and gases from the chimneys of locomotives and other engines, and has for its object to provide an effective device whereby the live embers are trapped and prevented from issuing from the smoke-stack.

The invention is illustrated by the accompanying drawings, in which—

Figure 1 is a longitudinal section, and Fig. 2 a transverse section, of the smoke-box of a locomotive to which the improved spark-preventer is applied. Fig. 3 is a plan of the spark-preventing device.

As shown by the drawings, I fit within the chimney A of the locomotive and extending downward to near the bottom of the smoke-box B a tube C, surrounding the exhaust-pipe D. This tube C is closed at its lower end, which fits closely upon the exhaust-pipe D, but has openings E in its sides, the combined areas of which openings are equal to the combined area of the fire-tubes, so as to reduce the disturbance of the fuel in the fire-box to a minimum. The intercepting device F is of funnel or box-like shape and is secured to the tube C above the line of fire-tubes around which its ends are led, so that the device extends in arch-like form transversely of the smoke-box, &c., the direction of the arrows showing the passage of the gases toward the chimney.

Having now described the invention, what I claim, and desire to secure by Letters Patent, is—

A spark-preventer for locomotive and other engines, comprising, in combination with the engine-funnel, a tube fitted therein and closed at its lower end and embracing the exhaust-pipe, said tube having openings in its sides, and funnel-shaped baffles in the shape of open-ended boxes surrounding said openings and extending transversely of the smoke-box to prevent the direct passage of the fire-gases from the smoke-tubes to the chimney.

In witness whereof I have hereunto set my hand in presence of two witnesses.

DUGALD DRUMMOND.

Witnesses:
   WALLACE FAIRWEATHER,
   JNO. ARMSTRONG, Jr.